(12) United States Patent
Grosche

(10) Patent No.: US 10,427,202 B2
(45) Date of Patent: Oct. 1, 2019

(54) COUPLING SYSTEM

(71) Applicant: Ludwig Ehrhardt GmbH, Laubach (DE)

(72) Inventor: Frank Grosche, Erndtebrueck (DE)

(73) Assignee: LUDWIG ERNHARDT GMBH, Laubach (DE)

( * ) Notice: Subject to any disclaimer, the term of this patent is extended or adjusted under 35 U.S.C. 154(b) by 666 days.

(21) Appl. No.: 15/106,296

(22) PCT Filed: Dec. 1, 2014

(86) PCT No.: PCT/EP2014/003203
§ 371 (c)(1),
(2) Date: Jun. 18, 2016

(87) PCT Pub. No.: WO2015/090513
PCT Pub. Date: Jun. 25, 2015

(65) Prior Publication Data
US 2017/0036260 A1    Feb. 9, 2017

(30) Foreign Application Priority Data
Dec. 20, 2013   (DE) .................. 10 2013 021 404

(51) Int. Cl.
*B21D 43/05* (2006.01)
*F16B 1/04* (2006.01)

(52) U.S. Cl.
CPC ......... *B21D 43/057* (2013.01); *B21D 43/055* (2013.01); *F16B 1/04* (2013.01)

(58) Field of Classification Search
CPC .... B21D 43/057; B21D 43/05; B21D 43/055; F16B 1/04; B30B 9/30
(Continued)

(56) References Cited

U.S. PATENT DOCUMENTS 2,637,576 A    5/1953   Nottingham
4,655,489 A    4/1987   Bisbing
(Continued)

FOREIGN PATENT DOCUMENTS

CN    202480404 U    10/2012
DE     29910398 U1   10/1999
(Continued)

OTHER PUBLICATIONS

English language abstract for CN 202480404 U (2012).
(Continued)

*Primary Examiner* — David B Jones
(74) *Attorney, Agent, or Firm* — Caesar Rivise, PC

(57) ABSTRACT

The invention relates to a coupling system, in particular for mechanically coupling a positioning mechanism to a gripper rail, comprising a coupling device (1), in particular on a positioning mechanism, a counter coupling device (2), in particular on a gripper rail, wherein the coupling device (1) and the counter coupling device (2) can be selectively coupled together or uncoupled, and a locking device (8-33), which locks the coupling device (1) to the counter coupling device (2) in a locking state and unlocks the coupling device (1) and the counter coupling device (2) in an unlocking state. According to the invention, the locking device (8-33) unlocks and locks solely on the basis of the motion of the coupling device (1) and of the counter coupling device (2) without an external drive.

19 Claims, 9 Drawing Sheets

(58) Field of Classification Search
USPC .................................................... 72/405.13
See application file for complete search history.

(56) References Cited

U.S. PATENT DOCUMENTS

| | | | |
|---|---|---|---|
| 4,661,009 A | 4/1987 | Tripp | |
| 4,753,102 A | 6/1988 | Braun et al. | |
| 4,881,398 A | 11/1989 | Daubner et al. | |
| 5,272,900 A | 12/1993 | Robbins | |
| 6,134,939 A * | 10/2000 | Sofy | B21D 43/055 198/621.1 |
| 7,802,460 B2 * | 9/2010 | Tokunaga | B21D 43/055 72/405.05 |
| 8,038,184 B2 * | 10/2011 | Grigis | B64D 29/06 292/332 |
| 8,376,423 B2 * | 2/2013 | Lesjak | E05O 19/022 292/332 |
| 8,522,679 B2 | 9/2013 | Zeibig et al. | |
| 8,857,239 B2 * | 10/2014 | Nishida | B21D 43/057 198/621.1 |
| 2009/0039580 A1 * | 2/2009 | Tokunaga | B21D 43/055 269/56 |
| 2011/0107924 A1 | 5/2011 | Zeibig et al. | |

FOREIGN PATENT DOCUMENTS

| | | |
|---|---|---|
| EP | 0205057 A2 | 12/1986 |
| EP | 0283810 A2 | 9/1988 |
| WO | 2009135552 A1 | 11/2009 |

OTHER PUBLICATIONS

State Intellectual Property Office of the People's Republic of China Search Report from corresponding CN 201480069426.0 (dated May 18, 2017).

International Search Report of PCT/EP2014/003203 dated Feb. 12, 2015.

\* cited by examiner

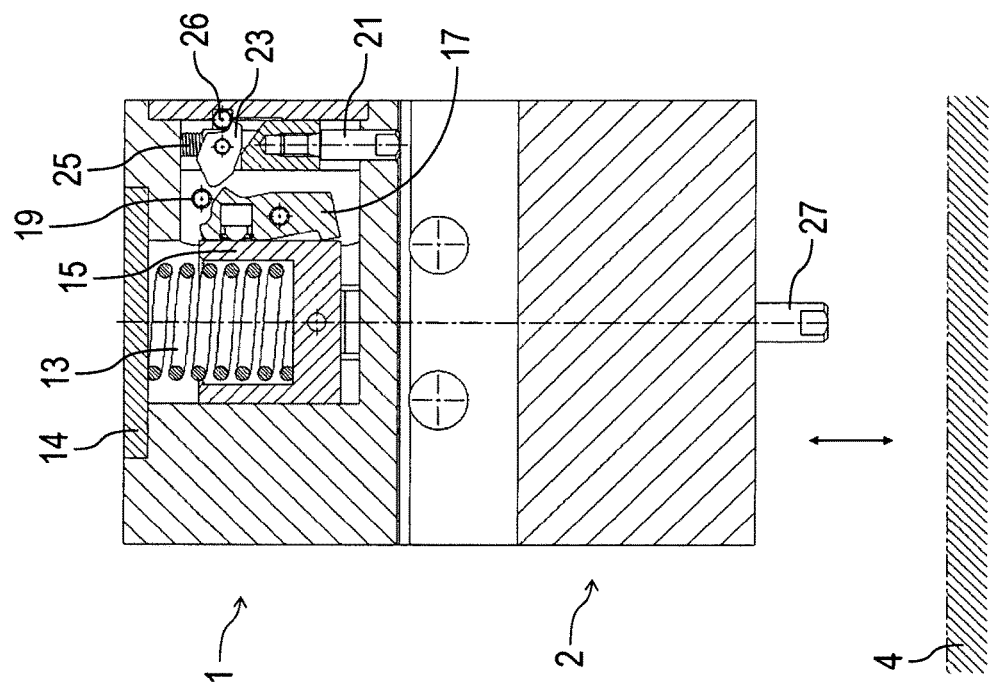
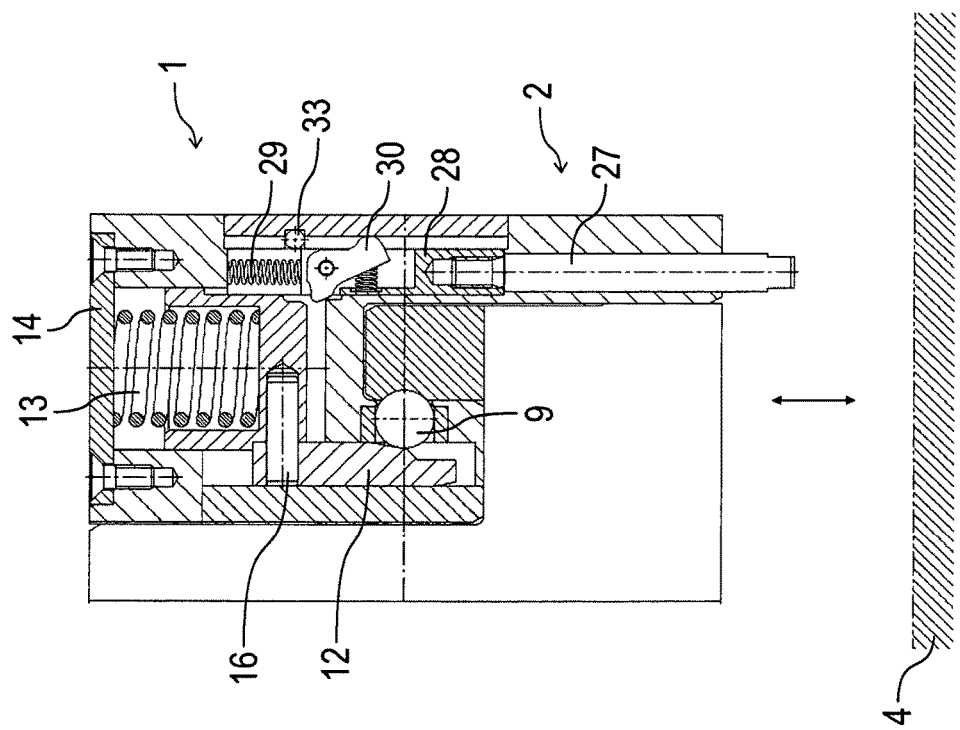
Fig. 3A
Fig. 3B

COUPLING SYSTEM

BACKGROUND OF THE INVENTION

The invention relates to a coupling system for mechanically coupling a coupling device to a counter-coupling device, in particular for mechanically coupling a positioning mechanism on a gripper rail.

A coupling system of this type is known for example from WO 2009/135552 A1, and in a mechanical press serves to connect a positioning device detachably to a gripper rail. The coupling system in this case has a locking device which is capable of locking a coupling device connected to the positioning device to a counter-coupling device connected to the gripper rail. The locking in this case takes place by means of locking balls, which are either pressed into a locking position or released by an axially displaceable tensioning pin. The tensioning pin in such case therefore has to be displaced axially for locking or unlocking. A pivotable actuating lever serves for this, which lever turns a gear wheel which engages in corresponding toothing in the tensioning pin, so that pivoting of the actuating lever results in corresponding axial displacement of the tensioning pin.

In the coupling system according to WO 2009/135552 A2, the unlocking can be brought about by jointly moving the coupling device and the counter-coupling device in the coupled-together and locked state laterally against a release projection, so that the release projection pivots the actuating lever and thereby unlocks the coupling system. However, in this case, in addition to the actual coupling motion of the coupling device and counter-coupling device, a transverse motion is necessary in order to press the actuating lever against the release projection.

What is disadvantageous about this known coupling system is the unsatisfactory operation of the locking device.

Coupling systems are likewise known from other fields of technology. For example, U.S. Pat. No. 2,637,576 discloses what is called a push-pull locking system for furniture for locking a furniture flap on a furniture carcass.

Further, DE 299 10 398 U1 discloses rock tongs for gripping rocks.

These documents however belong to completely different technical fields and do not therefore belong to the genre.

It is therefore an object of the invention to provide a correspondingly improved coupling system.

This object is achieved by a coupling system according to the invention.

SUMMARY OF THE INVENTION

The coupling system according to the invention first of all, in line with the known coupling system, has a coupling device which can be connected for example to a positioning mechanism, as is known for example from patent application WO 2009/135552 A1 already cited first hereinbefore, so that the content thereof is to be included in its entirety in the present description.

Furthermore, the coupling system according to the invention, in line with the known coupling system described first hereinbefore, comprises a counter-coupling device, which can be connected for example to a gripper rail, as is likewise known from patent application WO 2009/135552 A1 already cited first hereinbefore.

The coupling system according to the invention is however not limited to connecting a positioning mechanism to a gripper rail. Rather, the coupling device and the counter-coupling device may also be connected to other components or undergo connection thereto. In general, the coupling device and the counter-coupling device may be arranged on machine components, for example of machine tools or forming machines (e.g. presses).

Furthermore, the coupling system according to the invention too comprises a locking device, in order to lock the coupling device to the counter-coupling device in a locking state. In an alternatively possible unlocking state, the locking device on the other hand unlocks the coupling device from the counter-coupling device in order to permit separation of the coupling device from the counter-coupling device.

The coupling system according to the invention is distinguished in that the locking device can be unlocked and locked solely on the basis of the motion of the coupling device and the counter-coupling device without an external drive. The coupling system according to the invention as a result differs from the known coupling system according to WO 2009/135552 A1 described first hereinbefore, in which a pivoting motion of the actuating lever is necessary for locking or unlocking the locking device. In the coupling system according to the invention, the unlocking and locking on the other hand take place solely on the basis of the relative motion of the coupling device and counter-coupling device, which makes extremely simple handling possible.

To lock the locking device, the coupling device and the counter-coupling device are simply brought together mechanically, and this then automatically results in locking when the coupling device and the counter-coupling device come together.

The unlocking of the locking device on the other hand preferably takes place in that the coupled-together coupling system is placed on a base surface, the contact between the coupling system and the base surface then resulting in unlocking.

Furthermore, it should be mentioned that preferably only a single linear motion is necessary for coupling together and uncoupling the coupling device and the counter-coupling device, which makes simple kinematics possible. In particular, the coupling-together or uncoupling of the coupling system according to the invention does not require any pivoting motion or an additionally linear motion in another direction.

Upon coupling together the coupling system, the coupling device is therefore brought together with the counter-coupling device, preferably in a linear motion, this linear motion preferably taking place in the vertical direction. This offers the advantage that the counter-coupling device in the uncoupled state can simply stand on a base surface, with no separate holding means being necessary in order to fix the counter-coupling device. The coupling device can then simply be placed on the counter-coupling device which stands on the base surface to couple them together.

Further, it should be mentioned that the locking device in the locking state produces preferably both a frictional connection and a form fit connection between the coupling device and the counter-coupling device. The form fit connection may for example be produced by locking balls, which are pressed into a corresponding receptacle by a tensioning slider, as is known for example from WO 2009/135552 A1. The frictional connection in this case is preferably brought about in that the tensioning slider which acts on the locking ball is spring-loaded and presses the locking ball into the corresponding receptacle by means of a run-up slope on the tensioning slider.

In a preferred example of embodiment of the invention, the locking device not only brings about locking or unlocking of the coupling system, but also centering and/or alignment of the coupling device relative to the counter-coupling device. For example, the coupling device and/or counter-coupling device may for this purpose have run-up slopes, which upon coupling together slide on one another and thereby bring about centering and alignment of the coupling device and counter-coupling device relative to one another.

The unlocking or locking of the coupling system preferably takes place by two separate actuating elements, with a first actuating element bringing the locking device out of the unlocking state into the locking state upon actuation, whereas a second actuating element brings the locking device out of the locking state into the unlocking state upon actuation. Therefore preferably one actuating element in each case is provided for unlocking and locking.

In the preferred example of embodiment of the invention, the locking device has at least one spring in order to bring the locking device in spring-actuated manner from the unlocking state into the locking state, the spring being either in a tensioned state or in a tension-relieved state. The second actuating element, which serves for unlocking, in this case preferably acts on this spring and brings it during an unlocking operation into the tensioned state, the spring then no longer acting on the locking element (e.g. locking balls).

In this preferred example of embodiment, the locking device preferably has a holding device which holds the spring which serves for locking in the tensioned state without actuation by the first actuating element which serves for locking. The holding device (e.g. detent) therefore prevents the spring from being relieved and in so doing acting on the respective locking element (e.g. locking balls). The first actuating element which serves for locking upon actuation disengages this holding device, so that the spring is then relieved and in so doing brings the locking device into the locking state, in that the spring displaces for example a tensioning slider, which then in turn acts on locking balls, this being known per se from the prior art.

In the preferred example of embodiment of the invention, the holding device has a spring-loaded detent in order to hold the spring in the tensioned state. The first actuating element which serves for locking then upon actuation disengages the detent and thereby permits tension-relief of the spring, which then displaces for example an axially displaceable tensioning slider, which in turn acts on a corresponding locking element (e.g. locking balls).

Furthermore, the coupling system according to the invention preferably has a tensioning device, in order to tension the spring by actuating the actuating element which serves for unlocking. Upon actuation of the second actuating element, the latter therefore acts on the tensioning means, which then in turn tensions the spring. In the locking state, the spring is therefore preferably partially relieved, whereas the spring in the unlocking state is at least partially tensioned.

The tensioning device preferably has a spring-loaded entraining lever, the spring-loaded entraining lever in a relieved position permitting tensioning of the spring, whereas the spring-loaded entraining lever in a tensioned position does not permit tensioning of the spring.

It has already been briefly mentioned above that the coupling system according to the invention can be coupled together or uncoupled preferably by a single linear motion. The coupling system according to the invention therefore preferably has a specific connection direction, the coupling device and the counter-coupling device being moved relative to one another along the connection direction for uncoupling and coupling-together. The first actuating element which serves for locking may for example be a first actuating pin which is displaceable along the connection direction in the coupling device and at least in the unlocking state protrudes out of the coupling device. The second actuating element which serves for unlocking may on the other hand be a second actuating pin which is displaceable along the connection direction in the coupling device and at least in the locking state protrudes out of the coupling device. In the locking state, on the other hand, preferably only the second actuating pin which serves for unlocking protrudes out of the coupling system.

It has already been briefly mentioned above that the actual locking of the coupling device and counter-coupling device can take place for example by a locking ball, which in the locking state engages in a corresponding receptacle and thereby brings about locking. For example, the locking ball may be guided movably in the coupling device, while the corresponding receptacle is located in the counter-coupling device. The actuation of this locking device may take place for example by a displaceable tensioning slider, which is known per se from the prior art. In the locking state, the tensioning slider then presses the locking ball into the corresponding receptacle and thereby brings about locking of the coupling device and counter-coupling device. In the unlocking state, the tensioning slider on the other hand releases the locking ball and thereby permits separation of the coupling device and counter-coupling device.

Before a coupling operation, the first actuating pin which serves for locking preferably protrudes out of the coupling device. Upon coupling together, the counter-coupling device then presses the first actuating pin which serves for locking into the coupling device and thereby brings about locking.

In the coupled-together state, the actuating pin which serves for unlocking then protrudes out of the coupling device, this coupling pin protruding out downwards over the entire coupling system. Upon the coupled-together coupling system being placed on a base surface, the base surface then presses the second actuating pin which serves for unlocking into the coupling device and thereby brings about unlocking.

The coupling system according to the invention is therefore preferably distinguished by a tipping actuation both when locking and when unlocking.

Further, it should be mentioned that the invention is not restricted to the coupling system described above. Rather, the invention also covers a complete machine (e.g. press) with such a coupling system.

BRIEF DESCRIPTION OF SEVERAL VIEWS OF THE DRAWINGS

Other advantageous developments of the invention will be explained in greater detail below with reference to the figures together with the description of the preferred example of embodiment of the invention. Therein:

FIGS. 3A-3D are various sectional views of the coupling system according to the invention in the coupled-together, locked and lifted-off state.

DETAILED DESCRIPTION OF PREFERRED EMBODIMENTS

The drawings show a coupling system according to the invention with a coupling device 1 and a counter-coupling device 2 which can be coupled together.

Figure 5:
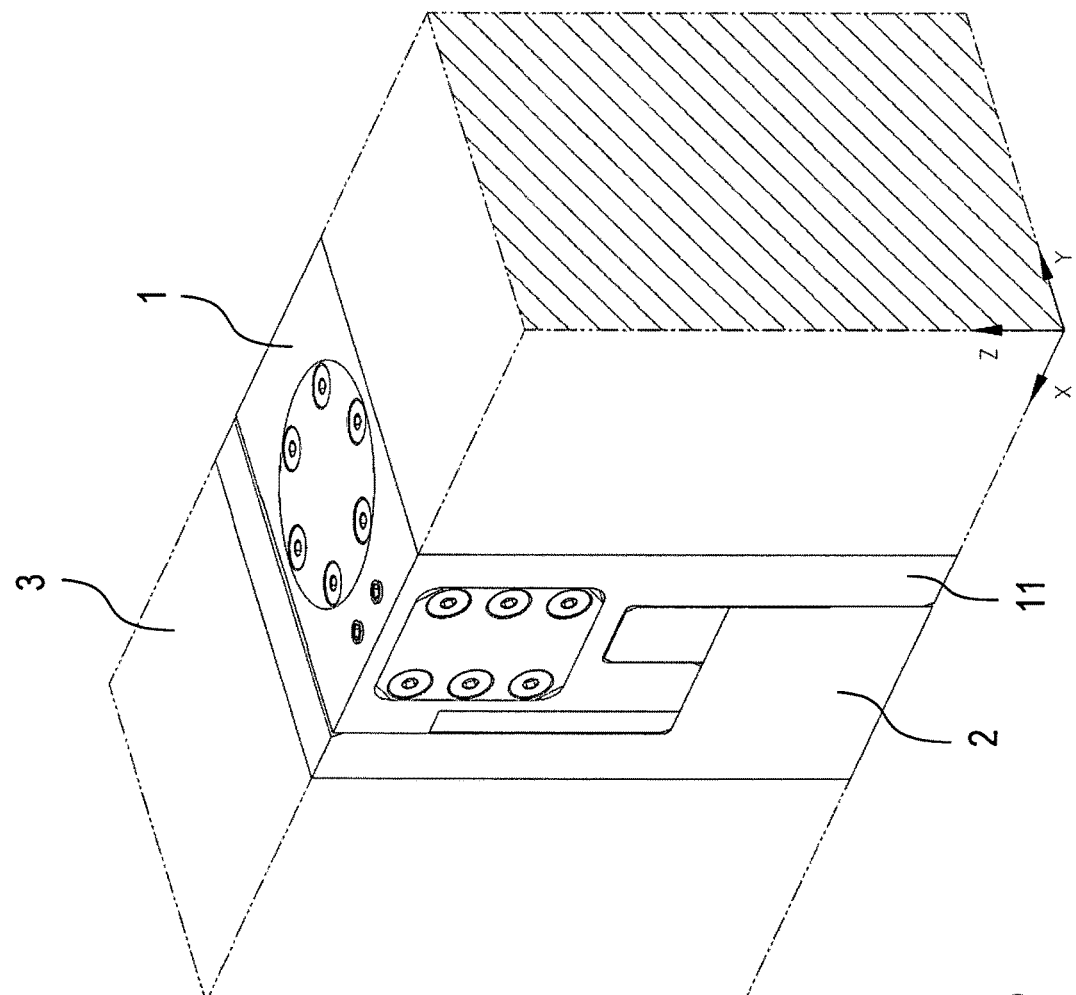
FIG. 5 is a perspective view of the coupling system according to the invention in the coupled-together state.

The coupling system according to the invention may be used for example instead of the coupling system known from WO 2009/135552 A2, in order to detachably couple together a positioning device (not shown) with a gripper rail 3 (cf. FIG. 5). The coupling device 1 is then connected to the positioning device, while the counter-coupling device 2 is connected to the gripper rail 3. The invention is however not restricted to this intended use, but also can be used for other purposes.

FIGS. 1A-1D show an uncoupled state of the coupling system in which the coupling device 1 is separated and uncoupled from the counter-coupling device 2. The counter-coupling device 2 then rests on a base surface 4, while the coupling device 1 is lifted off upwards.

The counter-coupling device 2 has on its upper side two crosspieces 5, 6 extending at right-angles to the plane of the drawing, which enclose a groove 7 which likewise extends at right-angles to the plane of the drawing. On the inside of the crosspiece 6 there is a receptacle 8 for a locking ball 9 in the coupling device 1. In the locking state in accordance with FIGS. 2A-2D and 3A-3D, the locking ball 9 in the coupling device 1 engages in the receptacle 8 in the counter-coupling device 2 and thereby locks the connection between the coupling device 1 and the counter-coupling device 2, as will be described in detail below.

The coupling device 1 has on its underside likewise two crosspieces 10, 11, which extend at right-angles to the plane of the drawing and enclose a groove. Upon coupling together the coupling device 1 and the counter-coupling device 2, the crosspiece 10 of the coupling device 1 is introduced into the groove 7 of the counter-coupling device 2 in the direction of the arrow. In so doing, the crosspiece 6 of the counter-coupling device 2 engages in the groove of the coupling device 1. The width of the groove between the two crosspieces 10, 11 of the coupling device 1 is therefore substantially identical to the width of the crosspiece 6, while the width of the groove 7 is substantially identical to the width of the crosspiece 10.

The locking ball 9 is arranged to be displaceable in the horizontal direction in the crosspiece 10 of the coupling device 1. In an unlocking position in accordance with FIGS. 1A-1D, the locking ball 9 is pressed towards the left into the crosspiece 10 and thus does not protrude to the right out of the crosspiece 10, so that the locking ball 9 does not engage the receptacle 8 in the crosspiece 6 of the counter-coupling device 2 either. In the locking position in accordance with FIGS. 2A-2D and 3A-3D, the locking ball 9 on the other hand is pressed towards the right by a vertically displaceable tensioning slider 12, so that the locking ball 9 then protrudes out of the crosspiece 10 and engages in the receptacle 8 in the crosspiece 6 of the counter-coupling device 2, and thereby locks the coupling device 1 to the counter-coupling device 2 in the coupled state.

In the coupling device 1 there is a coil spring 13 which is supported by its upper end on a housing cover 14 which is screwed on to the coupling device 1. By its lower end, the coil spring 13 is supported on a piston head of a vertically displaceable piston 15 which is arranged to be vertically displaceable in the coupling device 1, the piston 15 being connected to the tensioning slider 12 via a connecting pin 16. The coil spring 13 therefore presses the tensioning slider 12 downwards into the locking position via the piston 15 and the connecting pin 16, so that the tensioning slider 12 is spring-loaded.

In the unlocking position in accordance with FIGS. 1A-1D, the piston 15 is held in a raised position by a detent 17, so that the tensioning slider 12 is also then raised in the vertical direction, as a result of which the locking ball 9 in the crosspiece 10 of the coupling device 1 can move out of the way inwards and then does not protrude outwards out of the crosspiece 10.

The detent 17 in the coupling device 1 forms a two-sided lever and is pivotable about a rotation spindle 18, the pivoting motion of the detent 17 in a clockwise direction being limited by a stop 19. The detent 17 can therefore only be pivoted in a clockwise direction until the upper lever arm of the detent 17 comes to lie against the stop, as is illustrated in FIGS. 1B, 1D and 4B, 4D. Furthermore, the detent 17 is likewise spring-loaded by means of a coil spring which is set into a depression in the upper lever arm of the detent 17 and presses a mushroom-shaped sliding element 20 against the outer lateral surface of the piston 15. The coil spring of the sliding element 20 therefore tensions the detent 17 in a clockwise direction, as a result of which the piston 15 together with the tensioning slider 12 is held at the top in the unlocking position as long as the detent 17 is not disengaged, as will be described in detail below.

The detent 17 is disengaged by means of a feeler pin 21, which is arranged to be vertically displaceable in the coupling device 1, and in the unlocking position according to FIGS. 1A-1D protrudes downwards into the groove between the two crosspieces 10, 11 of the coupling device 1. Upon coupling together the coupling device 1 and the counter-coupling device 2, the crosspiece 6 of the counter-coupling device 2 therefore presses the feeler pin 21 of the coupling device 1 upwards into the coupling device 1.

The feeler pin 21 is screwed into the underside of a vertically displaceable slider 22, which bears on its upper side an unblocking lever 23 which is pivotable about a rotation spindle 24. The slider 22, together with the unblocking lever 23 and the feeler pin 21, is placed under downward initial tension by a coil spring 25.

Furthermore, the coupling device also has a stop 26 for the unblocking lever 23. Upon an upward motion of the slider 22 with the unblocking lever 23, the left-hand lever arm of the unblocking lever 23 pushes against the upper lever arm of the detent 17 and thereby pivots the detent 17 in an anticlockwise direction, as a result of which the detent 17 releases the piston 15, so that the piston 15 which is spring-loaded by the coil spring 13 presses the tensioning slider 12 downwards into the locking position. In so doing, the right-hand lever arm of the unblocking lever 23 pushes against the stop 26, as a result of which the unblocking lever 23 is pivoted somewhat in a clockwise direction.

Furthermore, the coupling system according to the invention permits unlocking and re-tensioning of the coil spring 13 by means of a further feeler pin 27, which is arranged to be vertically displaceable in the crosspiece 11 of the coupling device 1, and in the uncoupled state protrudes downwards out of the crosspiece 11 of the coupling device 1. The feeler pin 27 is screwed into the underside of a vertically displaceable slider 28, which is pressed downwards on its upper side by a coil spring 29.

The slider 28 bears a tensioning lever 30, which is pivotable about a rotation spindle 31 and is under initial tension in an anticlockwise direction by a coil spring 32. Furthermore, a stop 33 is arranged in the inner housing wall of the coupling device 1.

Upon an upward motion of the slider 28, a nose 34 of the tensioning lever 30 engages in a shoulder 35 in the piston 15. Upon a further upward motion of the slider 28, the tensioning lever 30 then pushes the piston 15 upwards together with the tensioning slider 12, until finally the detent 17 holds the piston 15 in the raised position again in accordance with FIGS. 1A-1D.

Upon a continuing upward motion of the slider 28, the tensioning lever 30 then pushes with its right-hand lever arm against the stop 33, as a result of which the tensioning lever 30 is pivoted in a clockwise direction, until the nose 34 of the tensioning lever 30 comes to lie against the outer lateral surface of the piston 15.

The various states of the coupling system and its state transitions will now be described below.

FIGS. 1A-1D show an uncoupled, tensioned state of the coupling system. In this state, the coupling device 1 is separated from the counter-coupling device 2. The piston 15 in this state is held in the raised position by the detent 17, so that the coil spring 13 is tensioned. The tensioning slider 12 is therefore likewise raised, so that the locking ball 9 can move out of the way laterally inwards into the crosspiece 10 of the coupling device 1, so that the locking ball 9 permits coupling-together of the coupling device 1 and the counter-coupling device 2. Finally, the two feeler pins 21, 27 are pressed downwards by the associated coil springs 25 or 29 respectively, and therefore protrude downwards out of the coupling device 1.

For coupling-together, the coupling device 1 and the counter-coupling device 2 are brought together in the vertical direction until the coupling device 1 and the counter-coupling device 2 assume the locking state shown in FIGS. 2A-2D.

Upon this coupling-together of the coupling device 1 and the counter-coupling device 2, the feeler pin 27 is pushed into the coupling device 1. Upon the resulting upward motion of the slider 28 which is connected to the feeler pin 27, the tensioning lever 30 pushes the piston 15 upwards together with the tensioning slider 12, so that the detent 17 is relieved for unblocking. Upon the further upward motion, the tensioning lever 30 pushes with its right-hand lever arm against the stop 33, as a result of which the tensioning lever 30 is pivoted in a clockwise direction and therefore does not block the downward motion of the piston 15.

Upon the coupling-together, the crosspiece 6 of the counter-coupling device 2 also presses the other feeler pin 21 of the coupling device 1 upwards into the coupling device 1. The feeler pin 21 in so doing, via the unblocking lever 23, unblocks the detent 17, which at this time is relieved of load, which thereupon releases the piston 15. The piston 15 then pushes the tensioning slider 12 downwards under the initial spring tension due to the coil spring 13. Upon its downward motion, the tensioning slider 12 pushes the locking ball 9 laterally towards the right, so that the locking ball 9 protrudes out of the crosspiece 10 of the coupling device 1 and then engages in the receptacle 8 in the crosspiece 6 of the counter-coupling device 2, as a result of which locking is brought about.

In FIGS. 2A-2D, the coupling system is therefore locked, so that the coupling device 1 can be raised, the coupling device 1 entraining the counter-coupling device 2 which is coupled securely thereto. Upon lifting the counter-coupling device 2 off from the base surface 4, the feeler pin 27 is then pressed downwards again by the coil spring 29 and then protrudes downwards again out of the crosspiece 11 of the coupling device 1, as is illustrated in FIGS. 3A-3D.

Figure 1A:
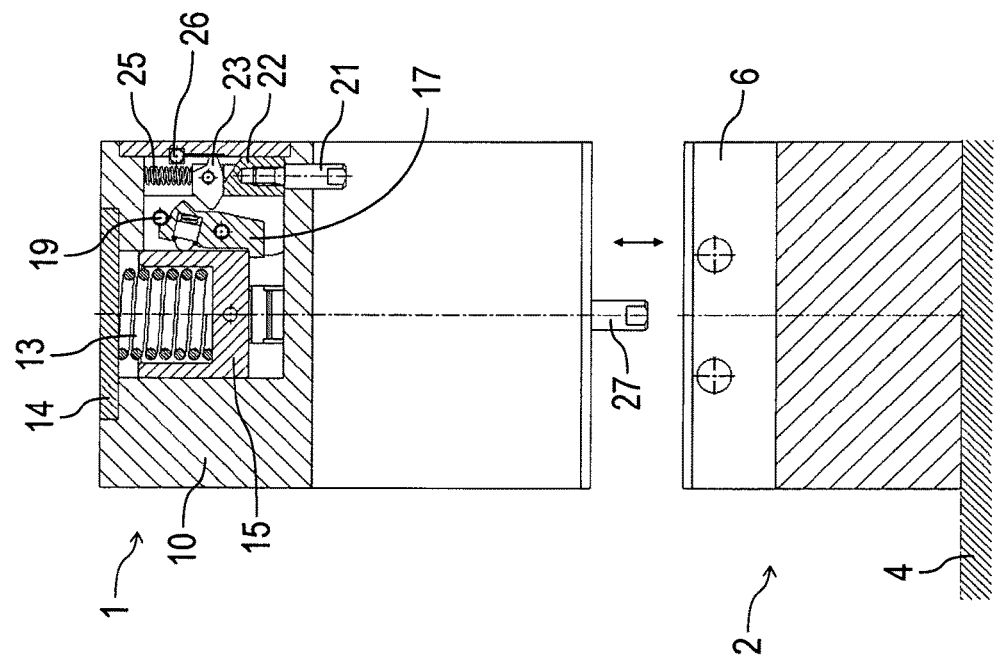
FIGS. 1A-1D are various sectional views of a coupling system according to the invention in the uncoupled state.
Figure 1B:
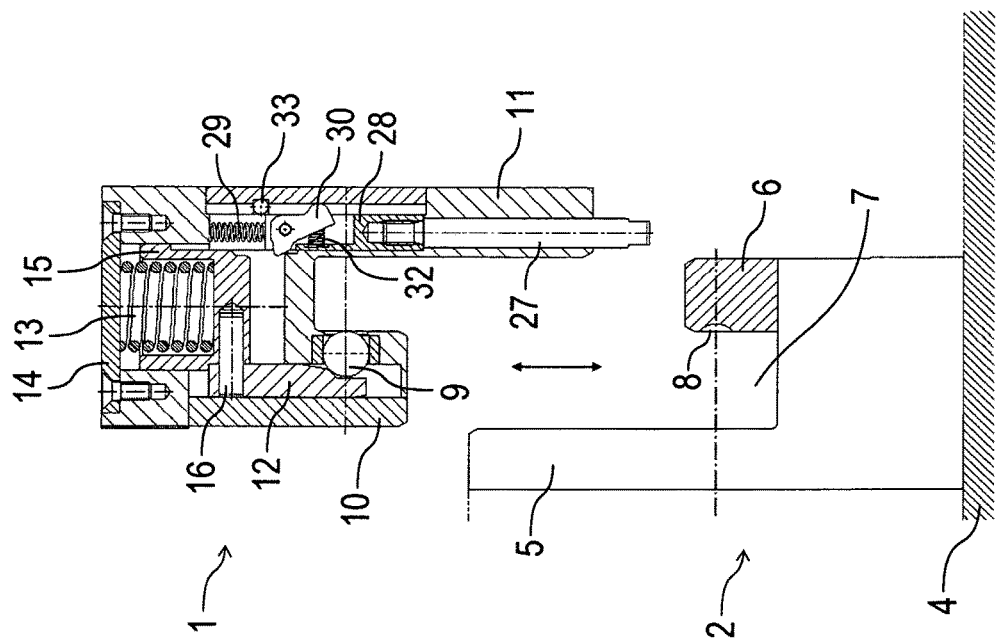
Figure 1C:
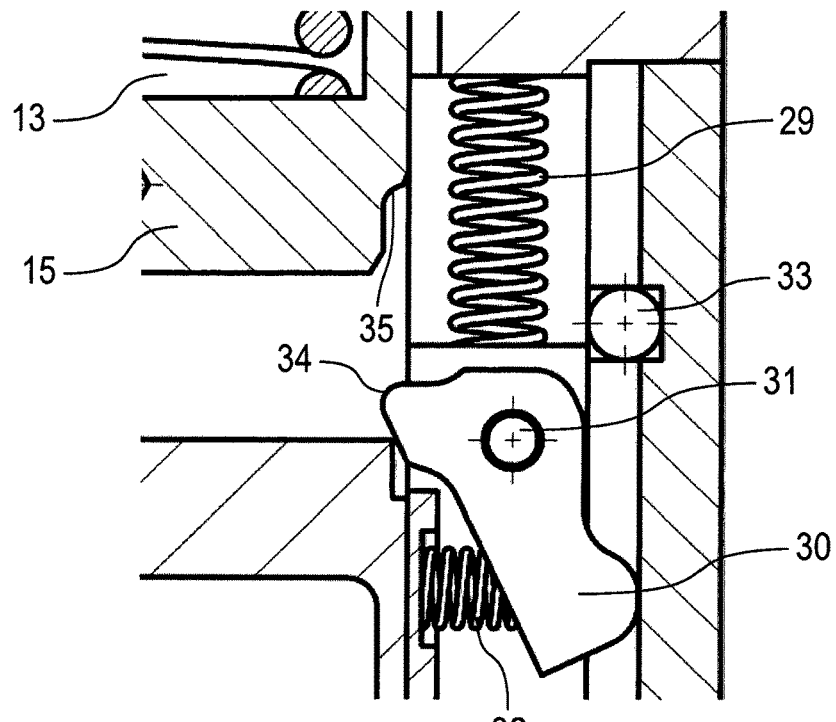
Figure 1D:
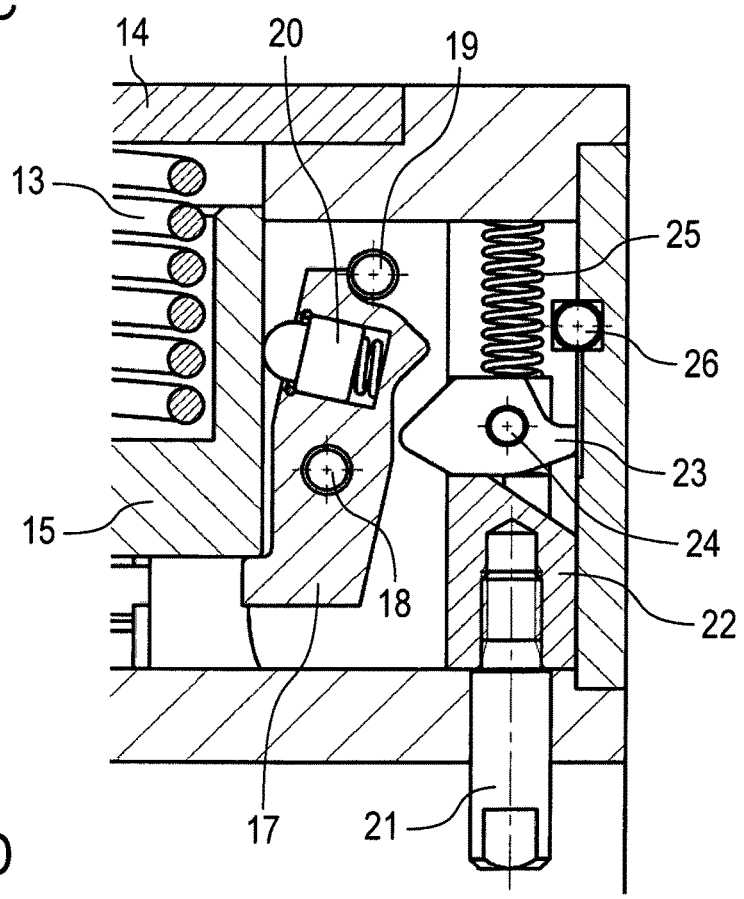
Figure 2B:
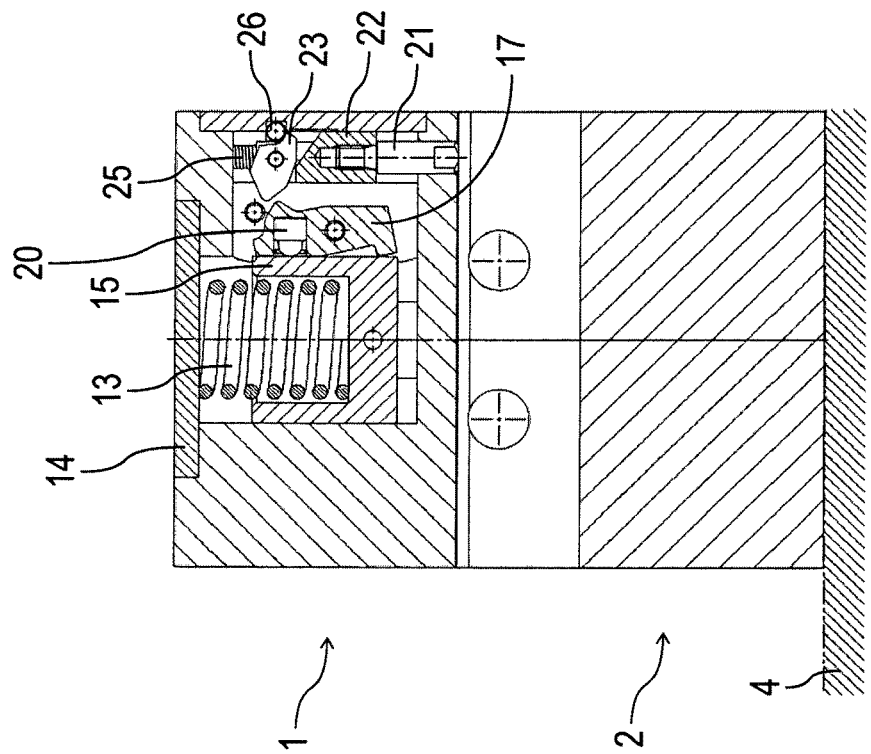
FIGS. 2A-2D are corresponding sectional views of the coupling system in the coupled-together and locked state on a base surface.
Figure 2A:
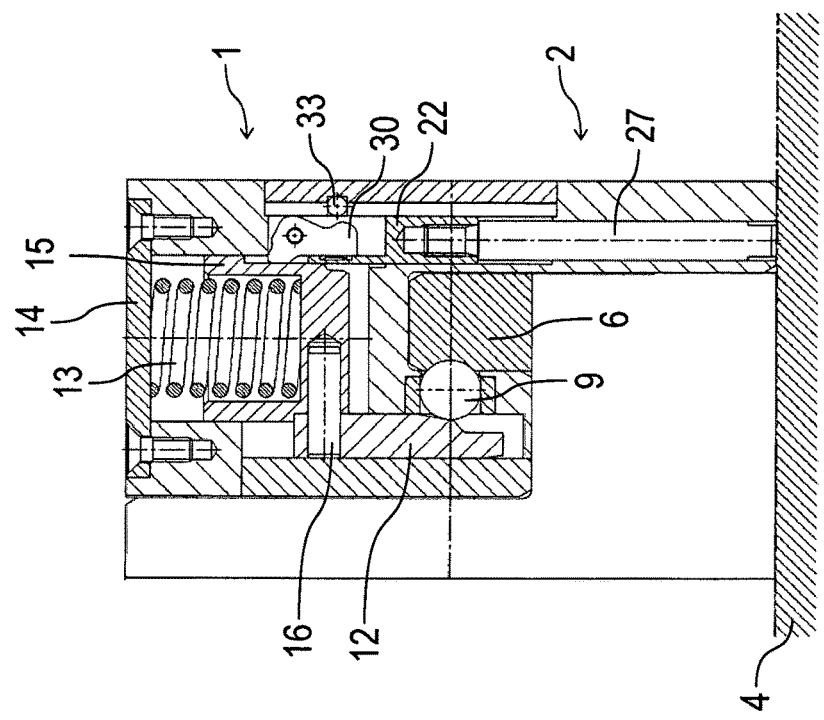
Figure 2C:
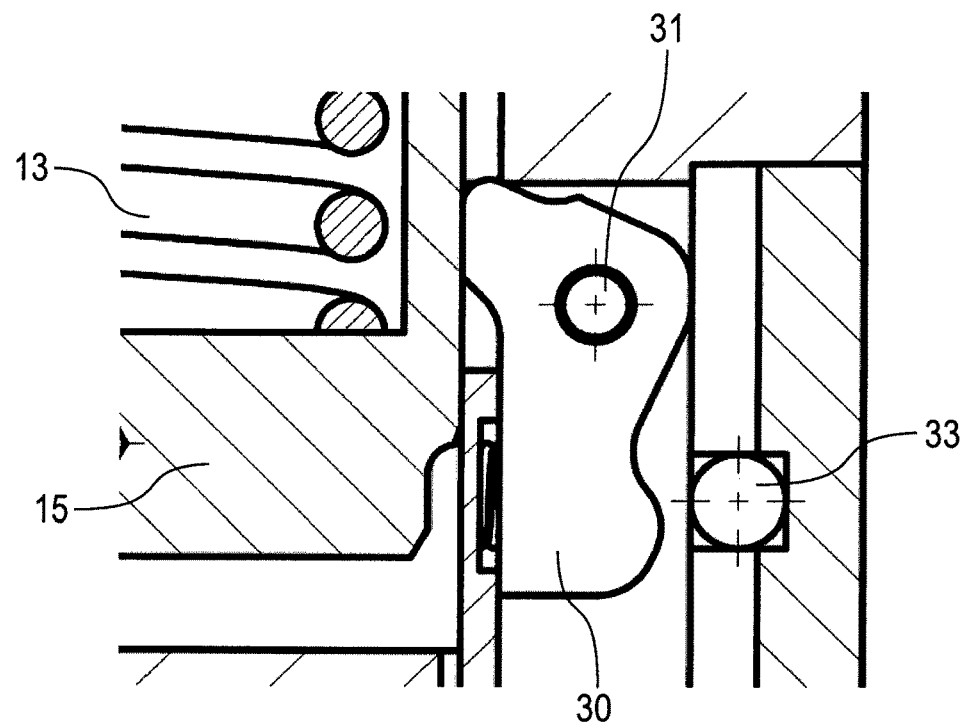
Figure 2D:
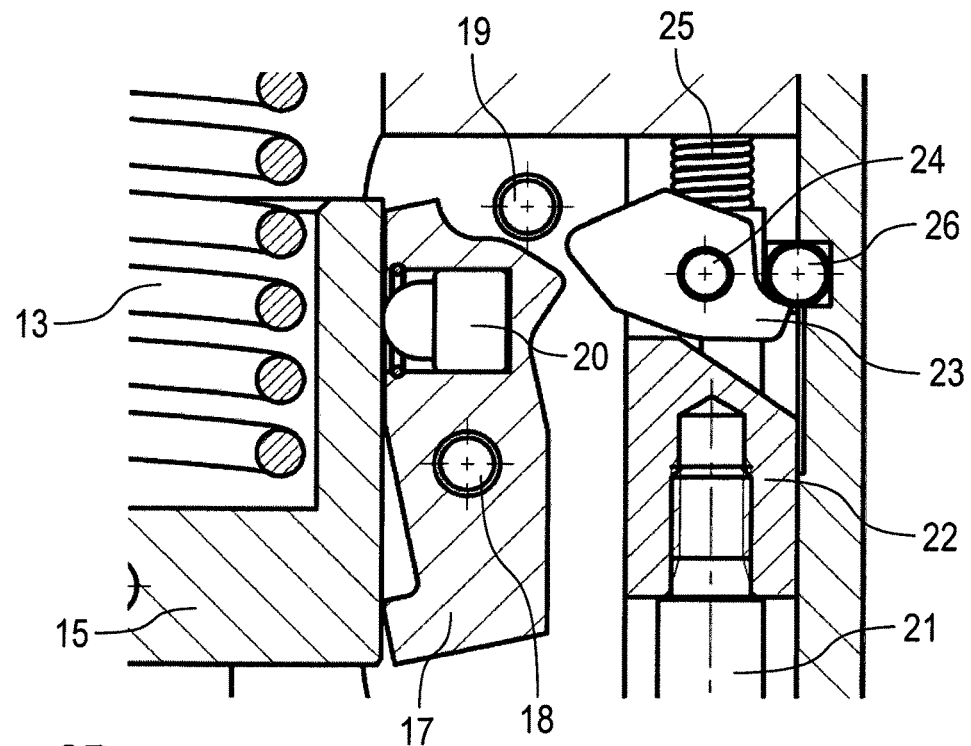
Figure 3C:
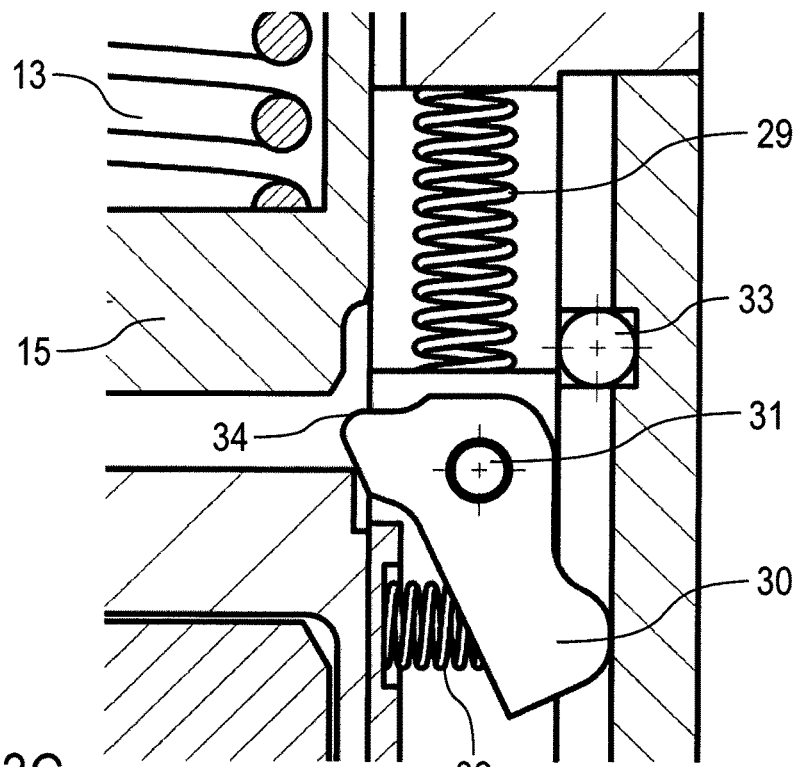
Figure 3D:
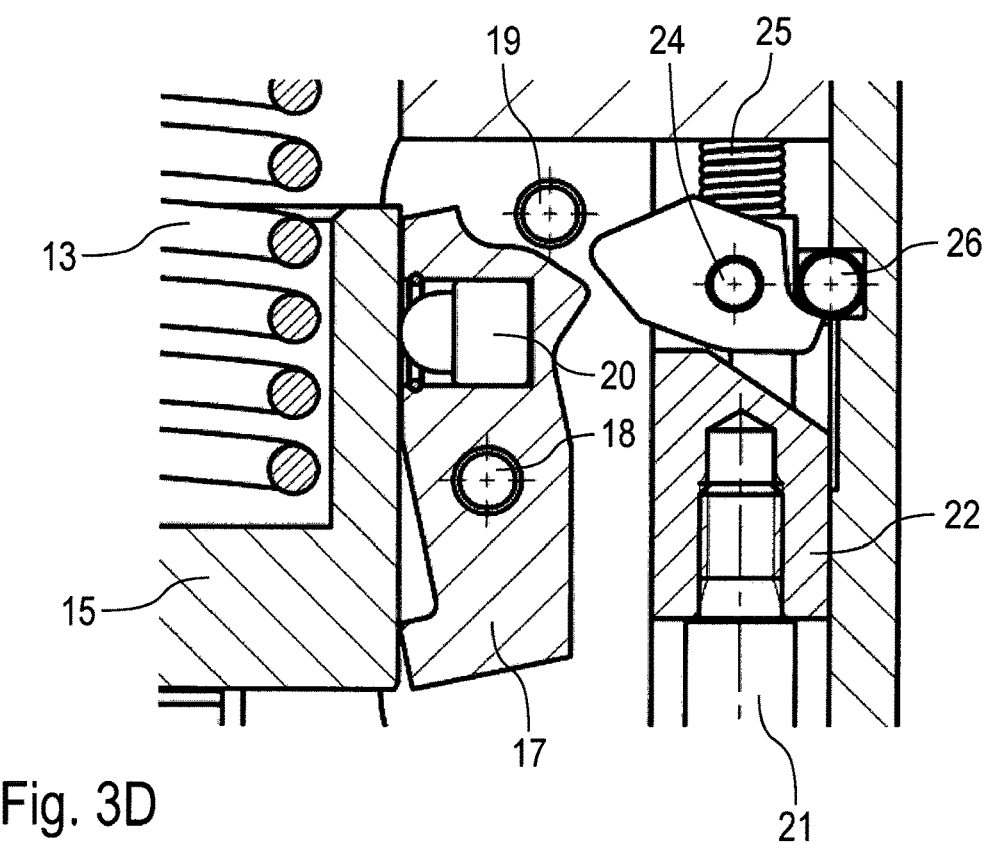
Figure 4B:
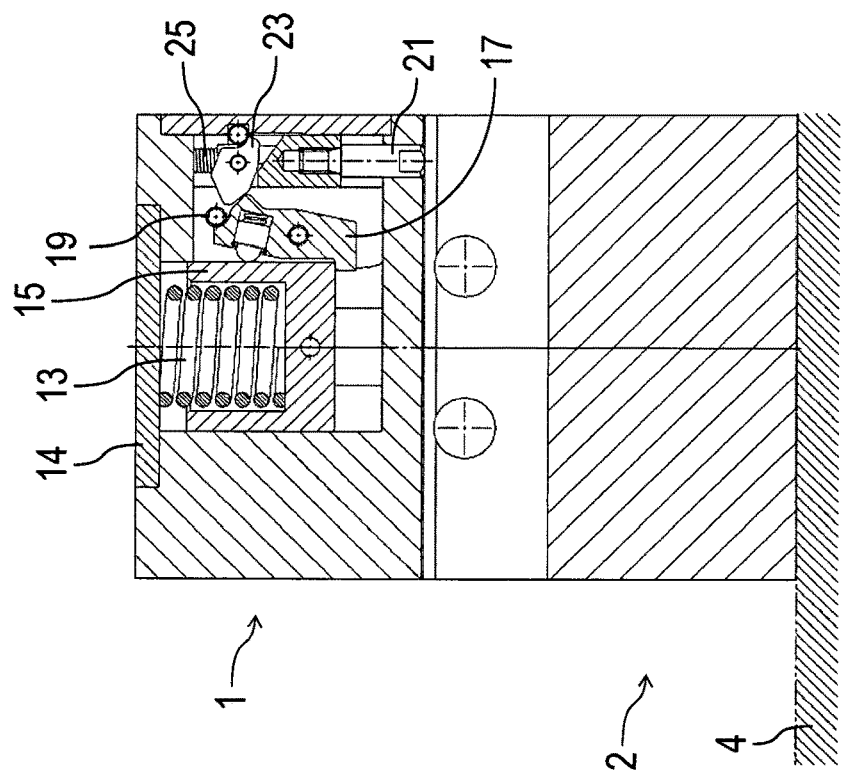
FIGS. 4A-4D are various sectional views of the coupling system according to the invention in the lowered and unlocked state.
Figure 4A:
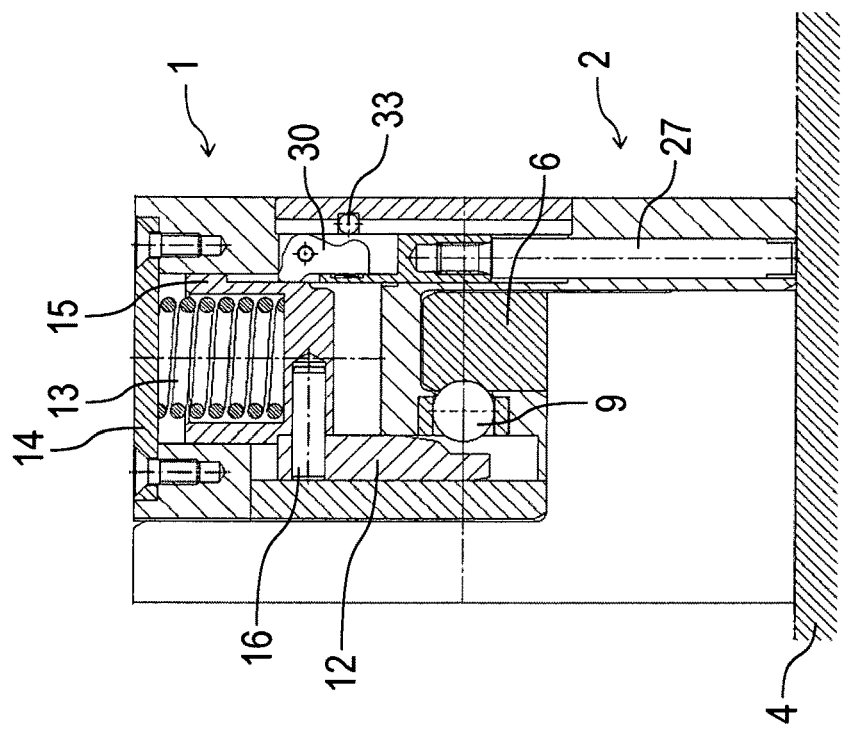
Figure 4C:
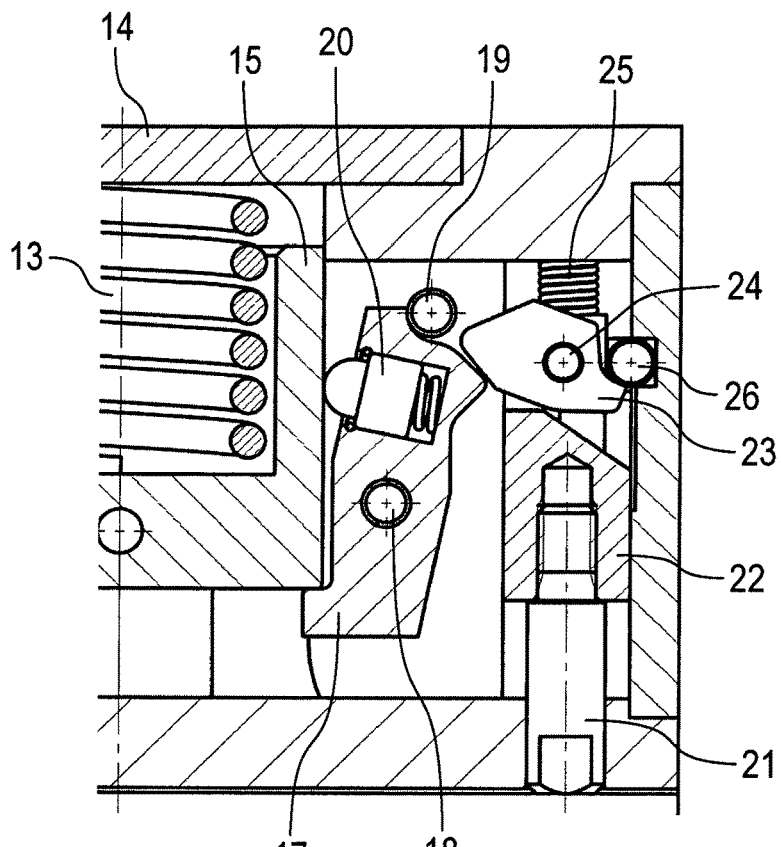
Figure 4D:
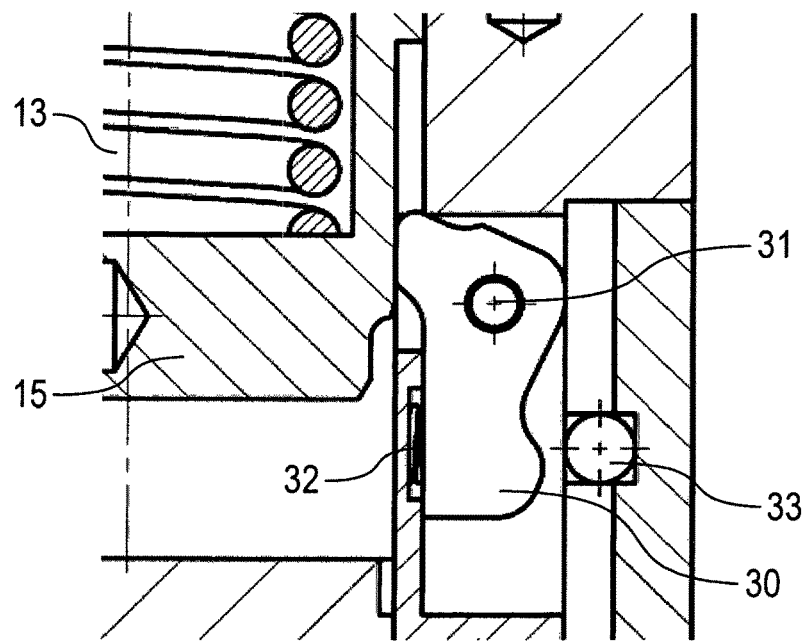

Upon placing the coupled-together coupling system on the base surface 4 again, the feeler pin 27 is then pushed in upwards into the coupling device 1 again. In so doing, the tensioning lever 30 pushes the piston 15 upwards until the piston 15 is then again held by the detent 17 in the raised position, as is illustrated in FIGS. 4B and 4C. Upon this pushing-upwards of the piston 15, the tensioning slider 12 connected to the piston 15 is also moved upwards, as a result of which the locking ball 9 can move out of the way laterally, so that the locking of the coupling system is disengaged. Upon the subsequent separation of the coupling system, the coil spring 25 then also presses the other feeler pin 21 out of the coupling device again, so that the state in accordance with FIGS. 1A-1D is produced again.

The invention is not restricted to the preferred example of embodiment described above. Rather, a large number of variants and modifications are possible, which likewise make use of the inventive concept and therefore fall within the extent of protection. Furthermore, the invention also claims protection for the subject and the features of the dependent claims independently of the claims referred to and in particular without the characterizing feature of the main claim.

LIST OF REFERENCE NUMERALS

1 coupling device
2 counter-coupling device
3 gripper rail
4 base surface
5 crosspiece of the counter-coupling device
6 crosspiece of the counter-coupling device
7 groove of the counter-coupling device
8 receptacle for locking ball
9 locking ball in the coupling device
10 crosspiece of the coupling device
11 crosspiece of the coupling device
12 tensioning slider
13 coil spring
14 housing cover
15 piston
16 connecting pin
17 detent
18 rotation spindle of the detent
19 stop for the detent
20 sliding element
21 feeler pin for locking and tensioning
22 slider
23 unblocking lever
24 rotation spindle of the unblocking lever
25 coil spring
26 stop for the unblocking lever
27 feeler pin for unlocking and tensioning
28 slider
29 coil spring
30 tensioning lever
31 rotation spindle of the tensioning lever
32 coil spring
33 stop for the tensioning lever
34 nose of the tensioning lever
35 shoulder in the piston

The invention claimed is:
1. A coupling system comprising:
   a) a coupling device,
   b) a counter-coupling device selectively coupled to the coupling device, and
   c) a locking device included in the coupling device and the counter-coupling device, the locking device configured to lock the coupling device to the counter-coupling device in a locking state and unlocks the coupling device and the counter-coupling device in an unlocking state, d) wherein the locking device unlocks and locks solely based on a relative motion of the coupling device and of the counter-coupling device without an external drive, the relative motion including bringing the coupling device and the counter-coupling device together to automatically lock the coupling device to the counter-coupling device, and placing the locked coupling system in contact with an external surface to automatically unlock the coupling device from the counter-coupling device,
e) the coupling system is configured for use with a machine,
f) the coupling device is configured to be arranged on a first machine component of the machine,
g) the counter-coupling device is configured to be arranged on a second machine component of the machine,
h) the first machine component is a positioning mechanism, and
i) the second machine component is a gripper rail.

2. A machine comprising a first machine component, a second machine component and a coupling system, the coupling system including:
a) a coupling device arranged on the first machine component of the machine,
b) a counter-coupling device selectively coupled to the coupling device, the counter-coupling device arranged on a second machine component of the machine, and
c) a locking device which locks the coupling device to the counter-coupling device in a locking state and unlocks the coupling device and the counter-coupling device in an unlocking state,
d) wherein the locking device automatically unlocks and locks the coupling device and the counter-coupling device solely based on a relative motion of the coupling device and of the counter-coupling device without an external drive.

3. The coupling system according to claim 1, the locking device including a locking member in one of the coupling device and the counter-coupling device, and a receptacle in another one of the coupling device and the counter-coupling device, the locking device providing a locking engagement between the coupling device and the counter-coupling device, the locking device configured to lock the coupling device to the counter-coupling device in a locking state via engagement of the locking member with the receptacle and to unlock the coupling device and the counter-coupling device in an unlocking state via disengagement of the locking member from the receptacle.

4. The machine according to claim 2, wherein
a) the locking device locks automatically upon coupling together the coupling device and the counter-coupling device, and
b) the locking device unlocks automatically if the coupled-together coupling system is placed on a base surface.

5. The machine according to claim 2, wherein only a single linear motion is necessary for coupling together and for uncoupling the coupling device and the counter-coupling device without a pivoting movement and without an additional linear motion in another direction.

6. The machine according to claim 5, wherein the counter-coupling device upon coupling together can stand on a base surface without a holding means.

7. The machine according to claim 2, wherein the locking device in the locking state produces a frictional connection and a form fit connection between the coupling device and the counter-coupling device.

8. The machine according to claim 2, wherein the locking device in the locking state brings about at least one of centering and alignment of the coupling device and the counter-coupling device relative to one another.

9. The machine according to claim 2, further comprising:
a) a first actuating element which brings the locking device out of the unlocking state into the locking state upon actuation, and
b) a second actuating element which brings the locking device out of the locking state into the unlocking state upon actuation.

10. The machine according to claim 9, wherein
a) the locking device has a spring in order to bring the locking device in spring-actuated manner from the unlocking state into the locking state, the spring being either in a tensioned state or in a tension-relieved state,
b) the second actuating element upon actuation brings the locking device into the unlocking state and in so doing brings the spring into the tensioned state.

11. The machine according to claim 10, wherein
a) the locking device has a holding device which holds the spring in the tensioned state without actuation by the first actuating element, and
b) the first actuating element disengages the holding device upon actuation, so that the spring is relieved and in so doing brings the locking device into the locking state.

12. The machine according to claim 11, wherein
a) the holding device has a spring-loaded detent in order to hold the spring in the tensioned state, and
b) the first actuating element upon actuation disengages the detent and thereby permits tension-relief of the spring.

13. The machine according to claim 10, wherein
a) the locking device has a tensioning device in order to tension the spring by actuating the second actuating element,
b) the second actuating element upon actuation acts on the tensioning device, which then tensions the spring.

14. The machine according to claim 13, wherein
a) the tensioning device has a spring-loaded entraining lever,
b) the spring-loaded entraining lever in a relieved position permits tensioning of the spring, and
c) the spring-loaded entraining lever in a tensioned position does not permit tensioning of the spring.

15. The machine according to claim 9, wherein
a) the coupling system has a specific connection direction, the coupling device and the counter-coupling device being moved relative to one another along the specific connection direction for coupling and uncoupling,
b) the first actuating element which serves for locking is a first actuating pin which is displaceable along the specific connection direction and at least in the unlocking state protrudes out of the coupling device, and
c) the second actuating element which serves for unlocking is a second actuating pin which is displaceable along the specific connection direction and at least in the locking position protrudes out of the coupling device.

16. The machine according to claim 1, wherein
a) the locking device has at least one locking ball which engages in a receptacle in the locking state, b) the locking device has a displaceable tensioning slider,
   b1) wherein the tensioning slider in the locking state presses the locking ball into the receptacle, and
   b2) whereas the tensioning slider in the unlocking state does not press the locking ball into the receptacle.

17. The machine according to claim 15, wherein
a) the first actuating pin protrudes out of the coupling device or the counter-coupling device, so that the first actuating pin is pushed in upon coupling together the coupling device and the counter-coupling device, and
b) the second actuating pin protrudes out of the coupling device or the counter-coupling device, so that the second actuating pin is pushed in independently of the coupling state if the coupling system is placed on a base surface.

18. The machine according to claim 2, wherein the machine is a press.

19. A coupling system, comprising:
a) a coupling device,
b) a counter-coupling device, wherein the coupling device and the counter-coupling device are selectively coupled together, and
c) a locking device which locks the coupling device to the counter-coupling device in a locking state and unlocks the coupling device and the counter-coupling device in an unlocking state,
d) wherein the locking device unlocks and locks solely based on a relative motion of the coupling device and of the counter-coupling device without an external drive,
e) the coupling system is configured for use with a machine,
f) the coupling device is configured to be arranged on a first machine component of the machine,
g) the counter-coupling device is configured to be arranged on a second machine component of the machine,
h) the locking device in the locking state brings about at least one of centering and alignment of the coupling device and the counter-coupling device relative to one another, and
i) at least one of the coupling device and the counter-coupling device have run-up slopes which upon coupling together bring about centering and alignment of the coupling device and the counter-coupling device relative to one another.

\* \* \* \* \*